United States Patent
Greenspan et al.

(10) Patent No.: US 10,348,739 B2
(45) Date of Patent: Jul. 9, 2019

(54) AUTOMATED DATA RISK ASSESSMENT

(71) Applicants: Steven L. Greenspan, Scotch Plains, NJ (US); Debra J. Danielson, Skillman, NJ (US); Kenneth William Scott Morrison, New Westminster (CA)

(72) Inventors: Steven L. Greenspan, Scotch Plains, NJ (US); Debra J. Danielson, Skillman, NJ (US); Kenneth William Scott Morrison, New Westminster (CA)

(73) Assignee: CA, Inc., New York, NY (US)

(*) Notice: Subject to any disclaimer, the term of this patent is extended or adjusted under 35 U.S.C. 154(b) by 243 days.

(21) Appl. No.: 15/019,750

(22) Filed: Feb. 9, 2016

(65) Prior Publication Data

US 2017/0230402 A1    Aug. 10, 2017

(51) Int. Cl.
*H04L 29/06* (2006.01)

(52) U.S. Cl.
CPC ........ *H04L 63/126* (2013.01); *H04L 63/1425* (2013.01); *H04L 63/1433* (2013.01)

(58) Field of Classification Search
CPC ... H04L 63/0263; H04L 63/1408–1425; H04L 63/1433–1466; H04L 63/20–205
See application file for complete search history.

(56) References Cited

U.S. PATENT DOCUMENTS

| | | | | |
|---|---|---|---|---|
| 8,614,633 B1* | 12/2013 | Lear | ..................... | G08B 29/188 |
| | | | | 114/382 |
| 9,386,078 B2* | 7/2016 | Reno | ....................... | H04L 67/10 |
| 9,661,013 B2* | 5/2017 | Reno | ................... | H04L 63/1433 |
| 9,881,304 B2* | 1/2018 | Morrison | ........... | G06Q 20/4016 |
| 2010/0125911 A1* | 5/2010 | Bhaskaran | ............. | G06Q 10/10 |
| | | | | 726/23 |
| 2012/0143357 A1* | 6/2012 | Chemel | ............... | F21V 23/0471 |
| | | | | 700/90 |
| 2015/0213449 A1 | 7/2015 | Morrison et al. | | |

OTHER PUBLICATIONS

Training. The Free Dictionary. (Year: 2018).*
Optimize. The Free Dictionary. (Year: 2018).*
Hawes, Larry. "I, Network: The Present and Future of Humans as Network Nodes—Part 1". <https://www.forbes.com/sites/larryhawes/2013/06/05/i-network-the-present-and-future-of-humans-as-network-nodes-part-1/#3838b3085a4a>. Published: Jun. 5, 2013. (Year: 2013).*

* cited by examiner

*Primary Examiner* — Kevin Bechtel
(74) *Attorney, Agent, or Firm* — Baker Botts L.L.P.

(57) ABSTRACT

A method is described for receiving a plurality of node data streams through a data network from a plurality of source nodes, respectively, each of the plurality of node data streams comprising a plurality of node data. The method further comprises determining a respective risk assessment for each of the plurality of node data streams based on a plurality of elements, wherein the respective risk assessment indicates a level of trustworthiness of each of the plurality of node data streams. Moreover, the method comprises determining a plurality of respective actions for each of the plurality of source nodes, based on the respective risk assessment of the plurality of node data streams. The method further comprises instructing each of the plurality of source nodes to perform the respective action.

20 Claims, 9 Drawing Sheets

AUTOMATED DATA RISK ASSESSMENT

TECHNICAL FIELD

The present invention relates generally to a networked system of source nodes and, more particularly, to the management of source node data streams through network applications.

BACKGROUND

Attacks carried out through the Internet against computer applications and equipment are increasing in frequency and sophistication. Although these attacks have often targeted web applications, they are increasingly focused on devices of the Internet of Things (IoT) revolution. The Internet of Things is the growing network of physical objects, devices, or 'things' embedded with electronics, software, sensors, and network connectivity, enabling data exchange and tracking. Emerging Internet of Things ecosystems rely upon valid streams of data to support analyses and decisions regarding a multitude of devices. Data streams may become invalid or inaccurate due to faulty sensors, misconfigured edge nodes, and malicious attack vectors.

Tools are presently available to detect and defend against attacks that are carried out through the Internet against HTML interface web applications. In contrast, IoT devices and applications, and the web services and application programming interfaces (APIs) they rely upon, suffer from immature technologies and methods for protection from such attacks. Because these devices interact with humans in a tangible manner, compromised security presents a much greater potential risk for enterprises and individuals than existing web applications. To effectively protect those that benefit from an IoT device or service, both the source of the data and the data stream should be evaluated for risk.

At present, there are no integrated solutions to provide a systematic method to score and manage risk associated with data in an IoT context. Statistical methods and analyses may be used to clean data, but such methods often rely on a statistical distribution of the data, instead of focusing on the data itself.

Accordingly, there is a need in the marketplace for a data risk assessment solution capable of proactively determining the risk of a data stream in an IoT environment or similar context. The present disclosure describes a data risk monitoring service capable of providing such a service. The present disclosure also applies risk assessment methods to data streams and transactions to provide valuable security for modern communications, such as, for example, app-to-app communications. This distinctive solution may be extended to applications, databases, storage, etc. Embodiments of the present disclosure may address the above problems, and other problems, individually and collectively.

SUMMARY

According to a non-limiting embodiment of the present disclosure, a method is disclosed comprising receiving a plurality of node data streams through a data network from a plurality of source nodes, respectively, each of the plurality of node data streams comprising a plurality of node data. The method further comprising determining a respective risk assessment for each of the plurality of node data streams based on a plurality of elements, wherein the respective risk assessment indicates a level of trustworthiness of each of the plurality of node data streams. The method further comprising determining a plurality of respective actions for each of the plurality of source nodes, based on the respective risk assessment of the plurality of node data streams. The method further comprising instructing each of the plurality of source nodes to perform the respective action.

According to another non-limiting embodiment of the present disclosure, a processing system configured to perform the aforementioned method.

According to another embodiment of the present disclosure, a computer program product comprising a computer-readable storage medium having computer-readable program code embodied therewith, the computer-readable program comprising computer-readable program code configured to perform the aforementioned method.

It is noted that aspects described with respect to one embodiment may be incorporated in different embodiments although not specifically described relative thereto. That is, all embodiments and/or features of any embodiments can be combined in any way and/or combination. Moreover, computer equipment, systems, methods, and/or computer program products according to embodiments will be or become apparent to one with skill in the art upon review of the following drawings and detailed description. It is intended that all such additional computer equipment, systems, methods, and/or computer program products be included within this description and protected by the accompanying claims.

BRIEF DESCRIPTION OF THE DRAWINGS

Aspects of the present disclosure are illustrated by way of example and are not limited by the accompanying drawings.

DETAILED DESCRIPTION

Figure 1:
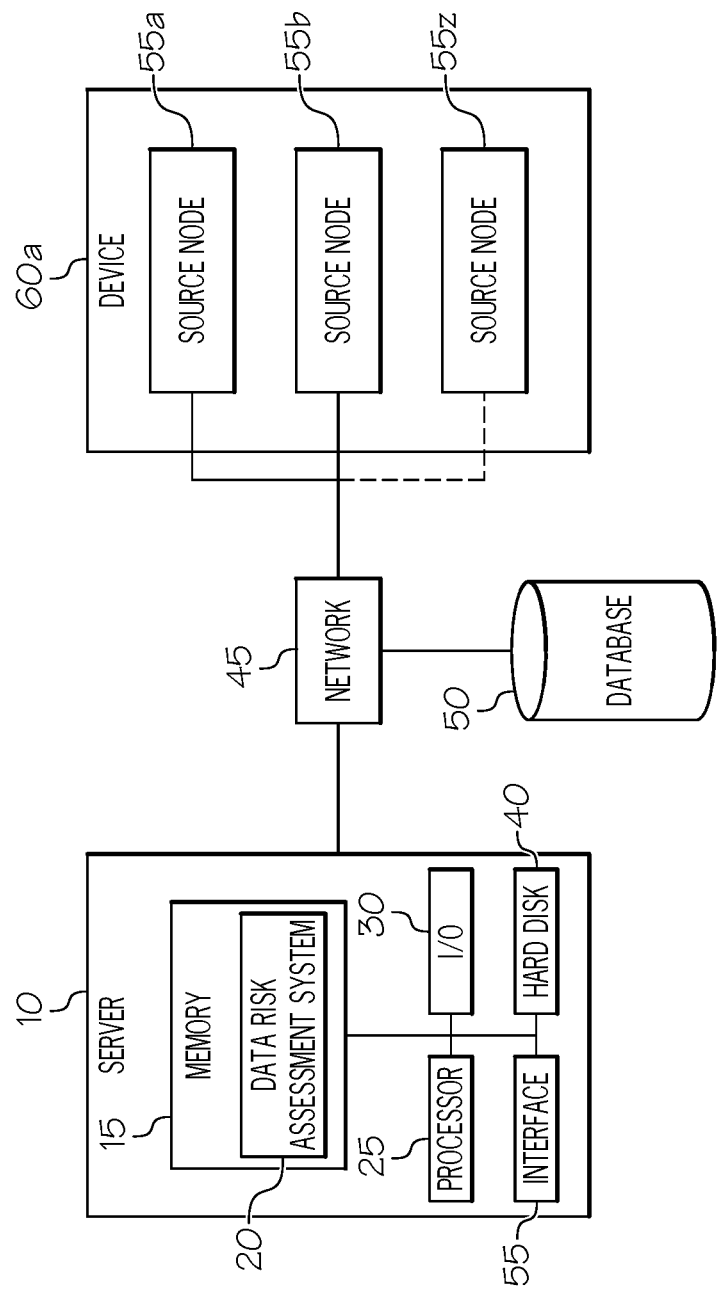
FIG. 1 illustrates a depiction of the data risk assessment ecosystem in a non-limiting embodiment of the present disclosure.

Various embodiments will be described more fully hereinafter with reference to the accompanying drawings. Other embodiments may take many different forms and should not be construed as limited to the embodiments set forth herein. Like numbers refer to like elements throughout.

Some non-limiting embodiments of the present disclosure disclosed herein comprise a system and method for applying an evaluation of risk to data packaged in web service or RESTful API transactions. Furthermore, some embodiments of the present disclosure comprise data that is packaged in any event stream or data stream that allows for the identification of a data source, and a means of identifying the attributes or keys associated with the data stream. Moreover, the current disclosure describes machine-to-machine (M2M) or device-to-device (D2D) data communications. In addition, some non-limiting embodiments of the present disclosure describe a data risk monitoring service, extensions of the methods of point-to-point transactions and publish-subscription data services, and a workflow and remediation service.

Some non-limiting embodiments of the present disclosure are directed to reducing security risks associated with the processing of application programming interface (API) transaction requests that are received through APIs of applications on computer equipment, such as applications providing application-to-application Web services or other API application endpoints. Some embodiments disclosed herein provide API transaction risk assessment element that may detect explicit threats on a transaction-by-transaction basis by scanning content of API transactions. For example, API transaction risk assessment element may detect explicit threats by scanning known attack signatures, specific thresholds, or anything else that may introduce risk and can be discovered within the boundaries of an API transaction. Moreover, the API transaction risk assessment element may detect more sophisticated attacks by analyzing API transactions spanning all or part of an entire transaction sequence from an application on a source node (e.g., client computer) and a destination node (e.g., application server), or a multitude of difference sequences from a plurality of nodes.

Some non-limiting embodiments of the present disclosure describe an API transaction and other non-limiting embodiments describe a stream of data from a source node of an IoT device. A system may comprise of both non-limiting embodiments. Furthermore, any description or illustration of a capability of one embodiment may be considered a description or illustration of a capability of any embodiment of the present disclosure.

As used herein, an "API transaction" may be any interaction occurring between two or more software applications that may be performed using a defined operational routine, data structure, object classes, and/or variable. For example, SOAP and REST service transactions can be performed using a defined API library of remote calls.

FIG. 1 illustrates a depiction of the data risk assessment ecosystem in a non-limiting embodiment of the present disclosure. The data risk assessment ecosystem may include a server 10, a memory 15, a data risk assessment system 20, a processor 25, an interface 55, an input and output ("I/O") device 30, and a hard disk 40. Data risk assessment system 20 analysis may take place on the server 10. Processor 25 may be operable to load instructions from hard disk 40 into memory 15 and execute those instructions. Memory 15 may store computer-readable instructions that may instruct the server 10 to perform certain processes. I/O device 30 may receive one or more of data from another server or a network 45. The server 10 may be considered a processing system or computer. Furthermore, data risk assessment system 20 may perform analysis on any processing system, wherein the processing system comprises one or more processors.

Network 45 may comprise one or more entities, which may be public, private, or community based. Network 45 may permit the exchange of information and services among users/entities that are connected to such network 45. In certain configurations, network 45 may be a local area network, such as an intranet. Further, network 45 may be a closed, private network/cloud, in certain configurations, and an open network/cloud in other configurations. Network 45 may facilitate wired or wireless communications of information and provisioning of services among users that are connected to network 45.

The data risk assessment ecosystem may also include a database 50 which may include, for example, additional servers, data storage, and resources. Data risk assessment system 20 may receive additional data from database 50. Data risk assessment system 20 may also store system performance, system analysis, and any information regarding risk assessment processes on the database 50. Database 50 may be any conventional database or data infrastructure. For example, database 50 may include scaled out data architectures (i.e., Apache Hadoop) and/or persistent, immutable stores/logging systems.

Data risk assessment system 20 analysis may include examination of a network device or system 60a, which may include a plurality of source nodes (i.e., 55a, 55b, 55z, etc.). Data risk assessment system 20 may analyze respective past and current performance of network elements, performance relationships between network elements, performance relationships between network elements and network services, respective performance trends of network elements, etc. Network elements may include, for example, any network devices, including those comprising source nodes.

Figure 2:
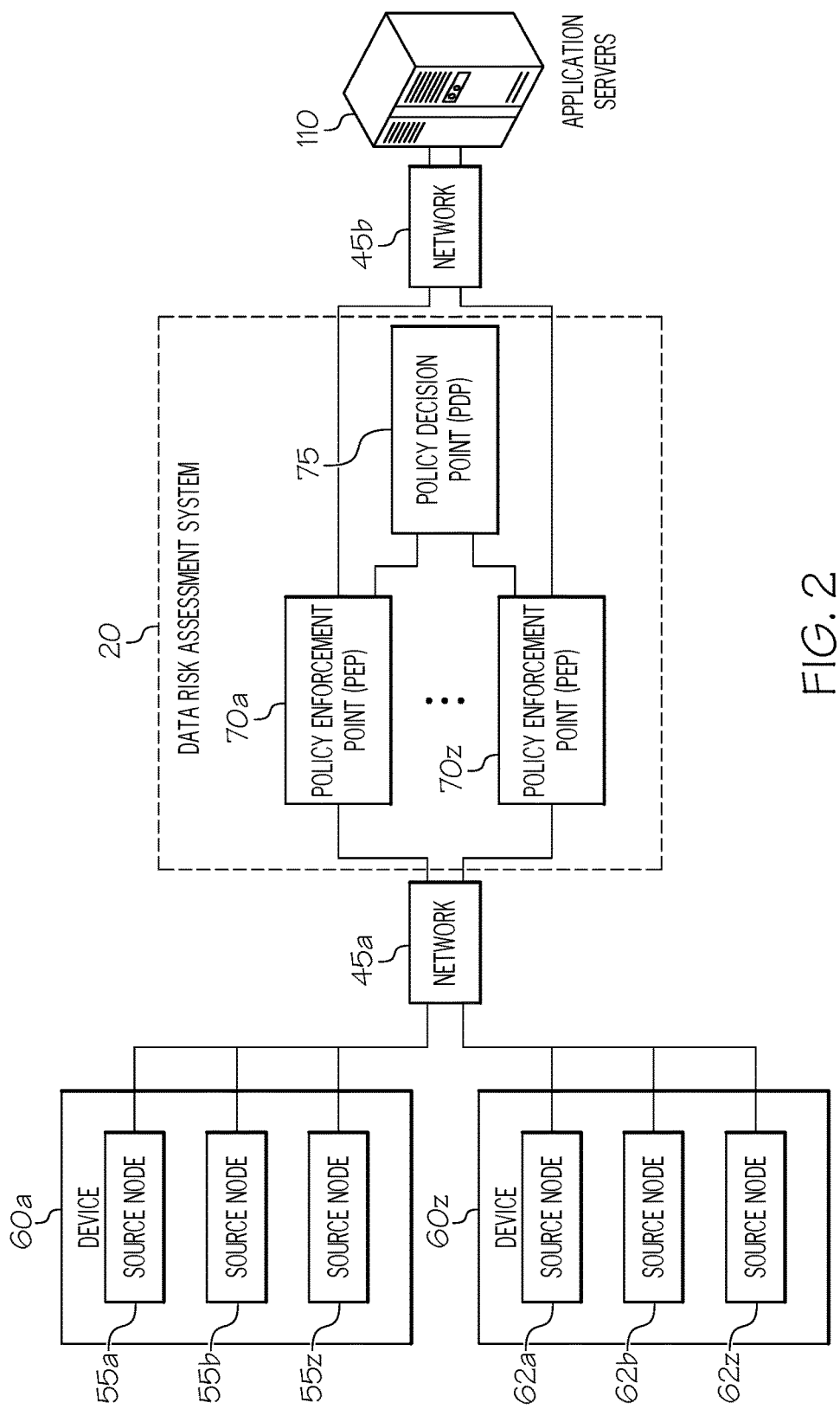
FIG. 2 illustrates a relationship between a source device and a data risk assessment system in a non-limiting embodiment of the present disclosure.

FIG. 2 illustrates a relationship between a source device and a data risk assessment system in a non-limiting embodiment of the present disclosure. Operations of the data risk assessment system 20 may reside in a plurality of policy enforcement points (PEPs) 70a-70z and a policy decision point (PDP) 75. One or more of the PEPs 70a-70z may be processed by a same computer host as the PDP 75, or may be processed on physically separate computer hosts that have different network addresses and communicate between them through one or more data networks 45a, 45b, etc. Furthermore, the plurality of PEPs may be supported by a singular PDP, or a plurality of PDPs, depending on the desired structure of the data risk assessment system 20. This architecture may be used in SAML-based active and passive access control systems, and/or system using the XACML protocol for authorization.

Furthermore, the PDP 75 may be separate, though not necessarily physically, from the PEPs 70a-70z. Separation of the PDP 75 and the PEPS 70a-70z promotes an administrative separation of concerns between administration of PDP-associated policy and rule sets, and PEP message-in-flight and data analysis handling policy (including remediation based on a risk score/assessment). In addition, separation of these two elements allows a single PDP to serve multiple PEP instances, especially useful in large enterprises, as depicted in FIG. 2.

Accordingly, the PDP 75 may operate as a centralized policy decision point for the plurality of geographically dispersed and communicatively connected PEPs 70a-70z that control deliverability of source node data streams from any number of source nodes 55a-55z and 62a-62z to any number of destination nodes (e.g. application servers 110). Furthermore, devices 60a-60z may be IoT devices, and may further be connected wirelessly to network 45a. Although a single PDP 75 and two PEPs 70a-70z are shown in FIG. 2, it is to be understood that any number of PDPs and PEPs may be used with various embodiments disclosed herein. Moreover, one or more of these embodiments may be implemented in any type of computer equipment or server ecosystem, and are not limited to use in a PDP and/or PEP.

The PEPs 70a-70z may be responsible for applying general transaction handling policies to an incoming Web service or to RESTful API transactions. In addition to access control, PEPs 70a-70z may also include basic per-message threat detection, message content transformation, rate limiting, and ultimate routing to internal service instances. Furthermore, PEPs 70a-70z may incorporate call outs to external PDP 75 to evaluate transaction context.

The PEPs 70a-70z can also be responsible for application of policy rules to Web services or source node data streams. The policy rules may define the context in which an algorithm is to be applied to a source node data stream, the data of which has not yet been delivered to a destination. The algorithm may control one or more of: authentication of credentials associated with a plurality of source nodes (e.g., 55a-55z and 62a-62z), validation of content of a plurality of source node data streams; modification of content of the API transaction request, and routing of a source node data stream to any destination (e.g. application server 110) and/or another source node of the system and/or another system. Evaluation of these steps may occur locally for performance reasons. However, some steps may leverage additional external infrastructure elements such as directories, databases, or various PDPs, as described herein.

The PDP 75 may be responsible for risk assessment and evaluation per source node data stream, which may be evaluated by each data point in the source node data stream. The PDP 75 may also be responsible for evaluation in a transaction context, which includes not just the information describing a current API transaction, but potentially information from previous API transactions. Furthermore, the PDP may be a rules engine that is optimized for risk evaluation. The rules can include rule sets that are compared (e.g., evaluated to determine if one or more is satisfied) to context information of a source node data stream to generate a risk assessment score. Rule sets that detect typical fraud patterns can be defined or developed by learning-based processes over time. In addition, rule sets can be customizable to detect emerging threats or to accommodate local needs.

The interface between PEPs 70a-70z and PDP 75 may be a simple request/response API. The input may describe source data stream or transaction context, including but not limited to originating IP address, authenticated or alleged (unproven) source or user identity, a unique deviceID (if available), and zero or more custom elements associated with the transaction, such as transport meta data (e.g., query or post parameters, URL, HTTP headers, MOM-headers, etc.), message content (e.g., credit card number, social security number, etc.), or values of PEP state variables (e.g. current access rate for a particular service or API), etc. A response from the PDP 75 may include a numeric risk assessment score (e.g., an integer from 0-100), and/or a decision representing a binning of numeric ranges. This binning may map to one of: ALLOW, DENY, ALERT (to trigger customized remediation, such as sending transaction to a honeypot), INCREASEAUTH (trigger explicit step up authentication, or similar secondary evaluation process). The PEP may also have access to historical data or enrichments data (e.g., white/black lists).

In a non-limiting embodiment of the present disclosure, if a device, data stream, data source node, data, transaction, or set of transactions is authenticated as ALLOWED, then the associated risk score or assessment may be appended to the device, data stream, data source node, data, transaction, or set of transactions (over a period of time). The PEPs 70a-70z may select the data, and the data and associated meta-data may be evaluated by the PDP 75 and a risk assessment or score may be returned. Upon receiving the risk assessment or score, the PEPs 70a-70z may append the risk assessment or score to the data, data stream, transaction, etc., and publish it to the publish-subscribe (pub-sub) system 80, as depicted in FIG. 3.

Figure 3:
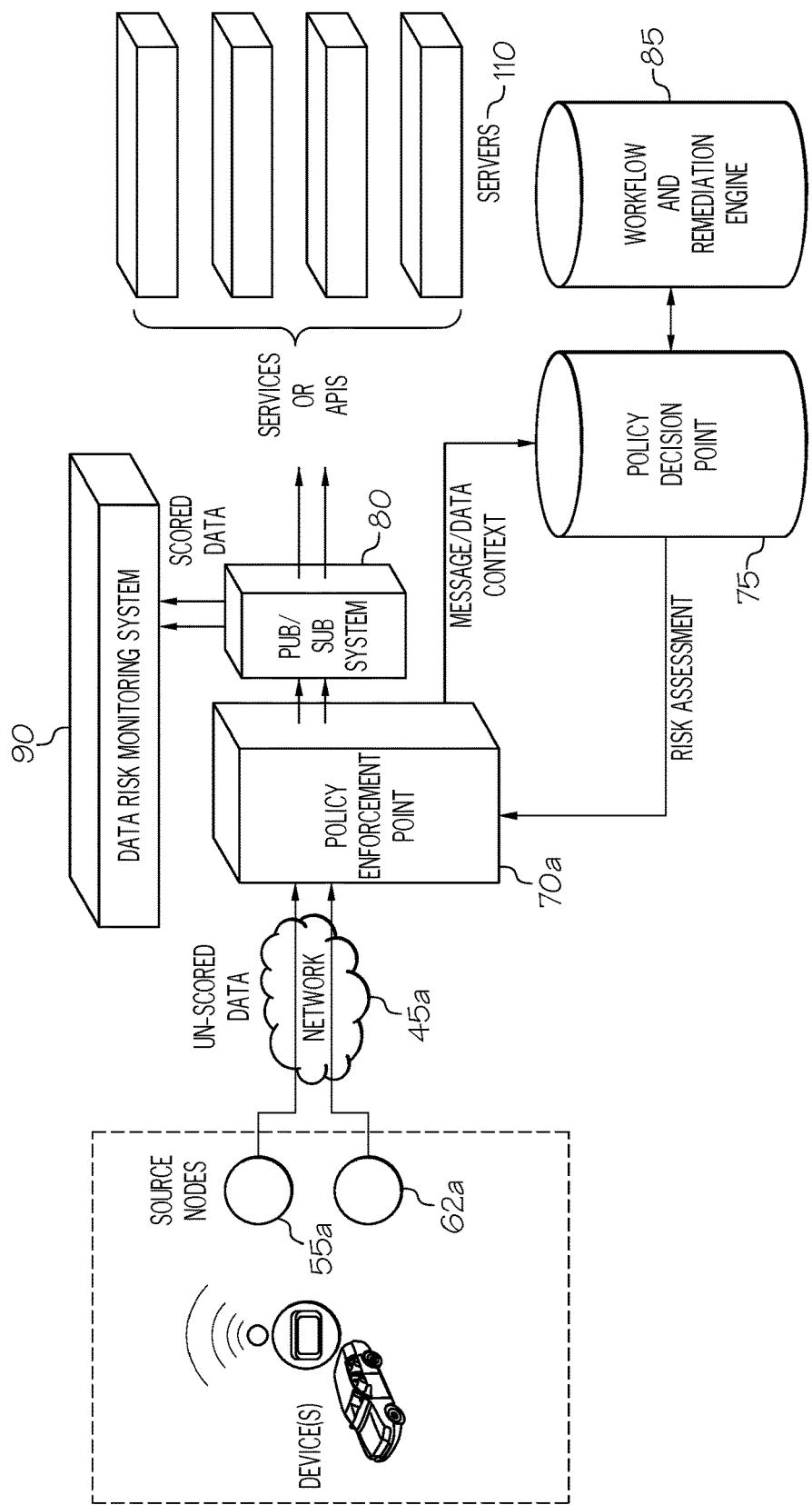
FIG. 3 illustrates the data risk assessment ecosystem in relation to data stream processing in a non-limiting embodiment of the present disclosure.

FIG. 3 illustrates the data risk assessment ecosystem in relation to data stream processing in a non-limiting embodiment of the present disclosure. IoT devices, as depicted in FIG. 3, may include edge nodes or gateways or source nodes (e.g. 55a, 62a) that may accumulate data from the IoT devices and may transmit this data to data risk assessment system 20. In some non-limiting embodiments, data from source nodes (e.g. 55a, 62a) may be sent as a RESTful transaction to subscribing services via a top-based or content-based publish-subscribe system 80. Raw data from source nodes (e.g. 55a, 62a) may be transmitted via network 45a to PEP 70a. In some non-limiting embodiments of the present disclosure, there may be a plurality of PEPs at this processing stage.

In some non-limiting embodiments of the present disclosure, the PEP 70a may determine that a device, a transaction, a set of transactions, or a source node data stream is authenticated as ALLOWED. Upon such designation, the associated risk assessment may be appended to the device, the transaction, the set of transactions, the source node data stream, and/or data of the source node data stream originating from, for example, a particular device or edge node. Data and associated meta-data from source nodes 55a and 62 a may be published or transmitted to the PEP 70a. The PEP 70a may pass data through to the pub-sub system 80, or the PEP 70a may determine that the data needs further examination and pass the data to the PDP 75. If the PEP 70a selects the data, the data and associated meta-data may be evaluated by the PDP 75 and a risk assessment may be returned to the PEP 70a. The risk assessment may be appended to the data and published to the pub-sub system 80. Any system subscribed to the pub-sub system 80 may receive the appended data, data stream, transaction, etc., for further analyses.

The data risk assessment system 20 may provide an automated method for risk assessment, in a pub-sub framework that allows a risk landscape to be monitored. In addition, the data risk assessment system 20 may perform all relevant tasks in real time, such that data is assessed and published as quickly as it is produced. Furthermore, the data risk assessment system 20 may perform all relevant tasks in near-real time (i.e., seconds or minutes), interaction time (i.e. less than thirty seconds), or analysis time (i.e., minutes or hours).

As illustrated in FIG. 3, data risk monitoring system 90 may subscribe to the published data based on a risk assessment or a variety of other factors such as the type of data, the origin of the data, the geographical location of the data, etc. Ultimately, this may feed back into the PEP and PDP's in real-time, or over other time periods, to allow the risk framework to adapt to long term trends. In combination with these factors, the data risk monitoring system 90 can create various analyses and views of the pattern of risk-scored data. By incurring a broad view of each risk assessment of a plurality of data streams, the data risk monitoring system 90 may generate a risk landscape of all data passing through the pub-sub system 80. Messaging within the pub-sub system 80 can devolve transactions or data between known sources and destinations, for efficiency, often after completion of a risk assessment. Moreover, subscribers to the pub-sub system 80 may designate the data risk they are willing to tolerate, and only receive data above the designated threshold. In addition to the risk assessment for each piece of data flowing through the data risk assessment system 20, downstream services may utilize the risk landscape to decide how to weight data in subsequent analyses and/or decisions.

In some non-limiting embodiments of the present disclosure, the method may incorporate factors relating to the potential sensitivity of the data type, as well as the value of the data. For example, in a threat score or risk assessment, there may be source information such as, for example, device_id, device_location, device_type (i.e., manufacturer/model number). Risk assessment may also depend on any context details of the source node. For example, if a known, well-regarded device such as a humidity sensor in a known location, it may be designated as a low risk source device or source node. If a humidity reading from this device or source node is coherent with the most recent reading of the device or source node, then the data risk score continues to be low. However, a sudden jump in humidity reading may trigger additional data risk processing by the data risk assessment system 20 that may result in a high risk assessment for data from this device or source node. A risk assessment may weigh a number of contextual elements, and return a risk score from zero (lowest potential risk) to 100 (highest potential risk). In addition, remediation may be applied to the data source, data, or transaction based on setting action windows across the range of risk scores. If the risk score is lower than a predefined threshold, data contained in the transaction will be sent to subscribing services via a pub-sub architecture (i.e., device centric or network backbone).

For example, to determine whether the device or source node is accurately reporting humidity, the data risk assessment system 20 may determine, for example, if the device or source node location is experiencing high rains or increasing humidity, if other devices or nodes in the region are also experiencing increasing humidity, etc. The data risk assessment system 20 may access the internet, or any other means of obtaining knowledge, to compare other relevant information to the context of the data reported by the device or source node. Furthermore, data risk assessment system 20 may also compare recent history of data readings from the device or source node to current data readings. If the relevant knowledge is unavailable or unknown, data associated with this device or source node may receive a high-risk assessment. The high-risk assessment may continue to be associated with the device or source node until data streams from the originating source may be determined to be low-risk and/or accurate.

A device or source node, such as, for example source nodes 55*a* and 62*a*, may be assigned a high-risk assessment because the data stream from the respective origin is inconsistent, suspect, or unusual when compared to a variety of factors. In evaluating data risk, for example, the data risk assessment system 20 may consider the calibration history of the device or source node, such as, for example, the time lapse since last calibration. If there is no calibration history, a policy may be established to increase the risk assessment of the device or source node until more calibration history can be recorded. As data stabilizes and a baseline is established, a high-risk assessment may decrease. A risk evaluation may also be based on why data from the device or source node is considered 'new data.' For example, the risk evaluation of the data may depend on whether the data is 'new data,' because the device or source node was recently calibrated, or whether the device or source node lost a network connection, or whether the device or source node is simply new to the network.

Furthermore, a data risk evaluation may consider the type of device or source node. For example, the data risk assessment system may consider whether this device or source node has known instabilities or whether it is prone to be dislodged from its current location, affecting the accuracy of its data stream. Furthermore, some devices or source nodes may be known to provide a limited amount of inaccuracies in its data stream. The data risk evaluation may be aware of such proclivities, and adapt its risk assessment accordingly. In addition, a data risk evaluation may consider a manufacturer's norms or tolerances for data ranges, variability, and response latencies.

In addition, a data risk evaluation may consider both internal and external data consistency. For example, the data risk evaluation may determine whether the consistency of data matches the norms or specifications for the device or source node. If the device or source node reports data that is not in accordance with such tolerances, the data risk assessment system may request the device or source node recalibrate, in addition to assessing a respective data stream from the location as high-risk. Furthermore, a data risk evaluation may consider external data consistency, such as, for example, whether there are nearby devices or source nodes producing similar congruous data. In such a case, the data risk evaluation may consider high-risk any data stream that is providing incongruous data.

Furthermore, a data risk evaluation may consider device or source node location and derived expectations regarding external factors that may cause phase shifts (e.g., solar cycle) or high variability (such as nearby construction). Moreover, a data risk evaluation may consider time stamping data transmissions or response latencies, as such irregularities may indicate device instability or security intrusions.

A data risk evaluation may provide additional information about the reliability of data from a device or source node. The risk evaluation method of the present disclosure provides the added benefits that data may not need analyst review, and that data along a risk spectrum may be weighted accordingly by the destination.

Some non-limiting embodiments of the present disclosure also allow the data risk monitoring system 90 to monitor multiple customers of an IoT network, allowing network providers to construct a data risk assessment score. The data risk monitoring system 90 may be aware of all risk assessments across an area or subject, correlated by region, location manufacturer, etc. With a broad awareness, the data risk monitoring system 90 may be able to better determine an attack vector or manipulation of a device or source node, in addition to normal benign inaccuracies. The data risk monitoring system 90 has the ability to subscribe to all data and respective risk assessments flowing through the data network or pub-sub system 80. Thus, the data risk monitoring system 90 may dynamically focus on certain subsets of data, based on a plurality of attributes or elements. Thus, the data risk monitoring system 90 may determine a risk landscape across verticals, regionals, manufacturers, etc., in order to detect anomalies that are due to device or source node misbehavior or related to a security attack.

As an exemplary non-limiting embodiment of the present disclosure, the data risk assessment system 20 may receive a data stream from a source node of a humidity sensor. A subscribing application to a pub-sub system 80 is responsible to irrigate the farm by monitoring a plurality of temperature sensors. One of the sensors is providing data indicating a really dry area, and the system may evaluate such data as high-risk, and the subscribing application may weigh the data differently in a watering algorithm, due to the risk assessment. The irrigation algorithm may give this humidity sensor the benefit of the doubt, and modify a watering algorithm to assume that the readings from the humidity sensor are 30% true. In addition, the subscribing application may request interval reading times for this humidity sensor to be decreased from once a day to once every ten minutes for the next two hours, in order to verify the accuracy of the data stream.

In another exemplary non-limiting embodiment of the present disclosure, the data risk assessment system 20 may receive a data stream from a source node of a temperature sensor in a device such as a vehicle of an IoT ecosystem. If the temperature sensor began to produce a reading of 100 degrees Celsius, the data stream (and each piece of data produced by the sensor) may receive a high-risk assessment. In addition, if the reading is incoherent with other temperature sensors in the device, the PEP (e.g., 70a) may determine to change the pinging period to five times per second for the next minute to determine if the readings are consistent, possibly indicating that the device is on fire. Because the data risk assessment system 20 is capable of requesting a specific sensor or source node to produce readings at smaller intervals, the request is not system wide across the device increasing the amount of additional data to subscribing destinations or applications.

Figure 4:
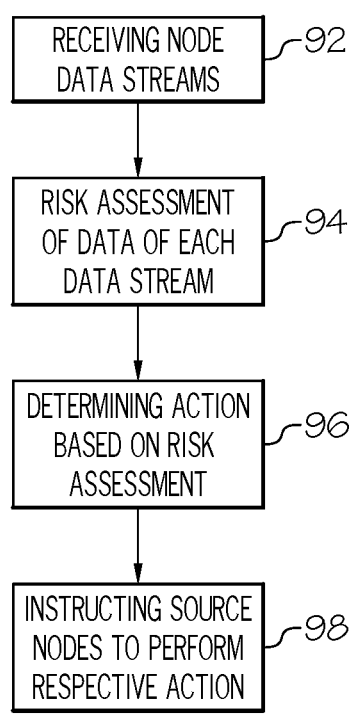
FIG. 4 illustrates a general block diagram of a process that may be performed by a non-limiting embodiment of the present disclosure.

FIG. 4 illustrates a general block diagram of a process that may be performed by a non-limiting embodiment of the present disclosure. In step 92, the data risk assessment system 20 may receive node data streams from a plurality of devices or source nodes. In step 94, the data risk assessment system 20 may conduct a risk assessment of the data of each of the plurality of data streams. Furthermore, in step 96, the data risk assessment system 20 may determine an action, to be performed at the device or source node, based on the determined risk assessment. Finally, in step 98, the data risk assessment system 20 may instruct the device or source node to perform a respective determined action, in accordance with the risk assessment.

Figure 5:
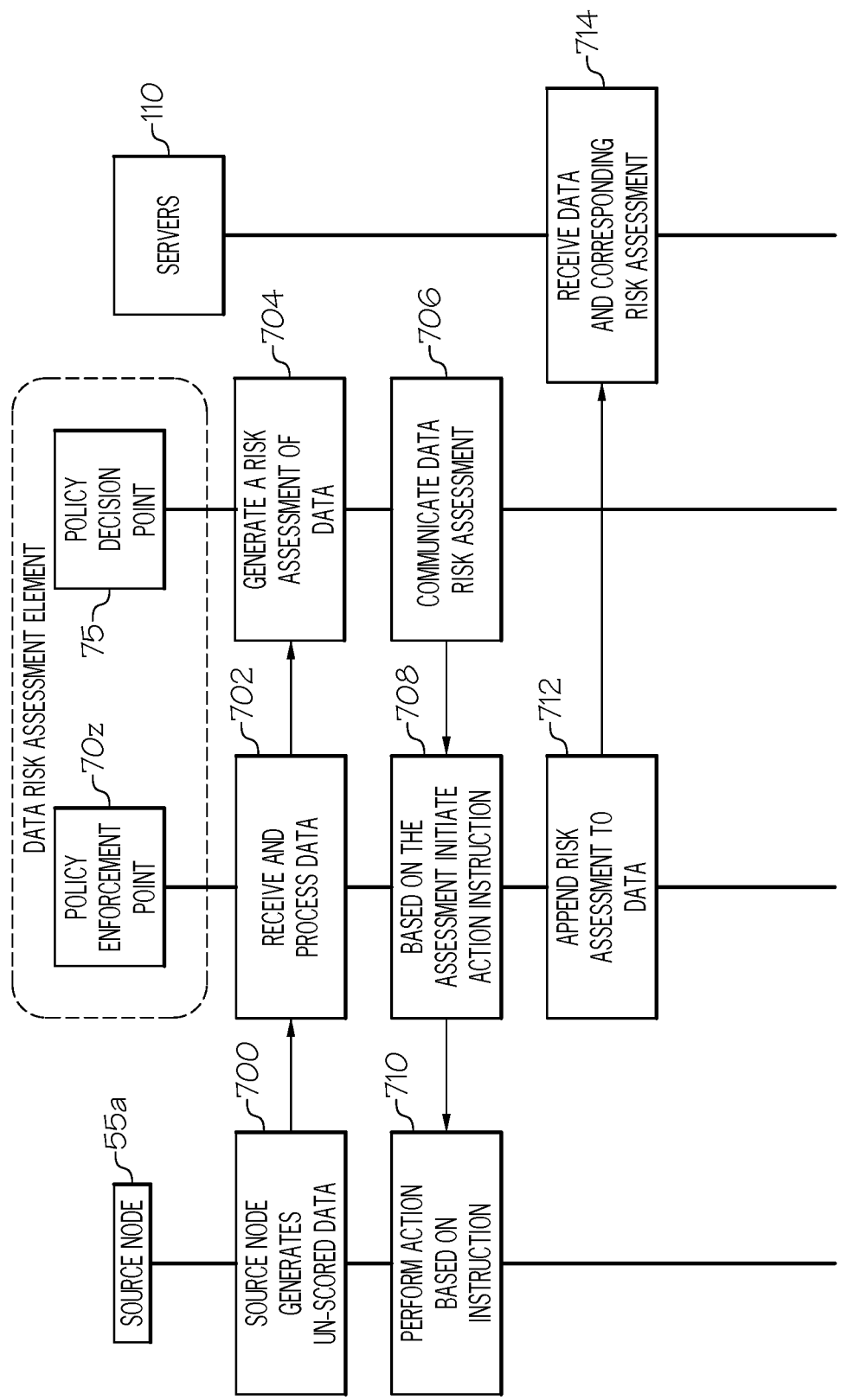
FIG. 5 is a flowchart of operations and information flows that may be performed by a non-limiting embodiment of the present disclosure.

FIG. 5 is a flowchart of operations and information flows that may be performed by a non-limiting embodiment of the present disclosure. In step 700, a source node 55a may generate raw un-scored data, such as, for example, sensor readings or data describing characteristics of an IoT device. In step 702, a PEP (e.g., 70z) may receive and process the produced data. At step 704, a PDP (e.g., 75) may receive the data and generate a risk assessment based on discussed factors and context. For example, the PDP may consider the data source, the data, a data stream, and/or a transaction in light of other similar contexts in the system. Furthermore, the PDP may consider normative models provided by similar contexts or manufacturers. Next, in step 706, the PDP 75 may communicate the data risk assessment to the PEP 70z. Based on the data risk assessment, the PEP 70z, in step 708, may initiate an action instruction for the reporting source node 55a. For example, in some non-limiting embodiments of the present disclosure, the PEP 70z may request the source node 55a to perform a recalibration if the PEP 70z received a high-risk data assessment. In step 710, the source node 55a may perform the action as instructed.

The PDP 75 may obtain risk assessment rules or algorithms from a remote repository(ies) (e.g., a centralized repository used by a plurality of PDPs) and/or an internal repository, and may develop or modify risk assessment rules or algorithms over time, such as based on feedback received from the PEP (e.g. 70z), the destination node or system 110 and/or the source node/application.

In addition to providing action instructions to the source node 55a, the PEP 70z may append the risk assessment to respective data of a data stream from source node 55a, and communicate the appended data to subscribed servers 110, as depicted in step 712. Finally, in step 714, servers 110 may receive data and corresponding risk assessment, and further determine how to process the data in accordance with its risk assessment.

Figure 6:
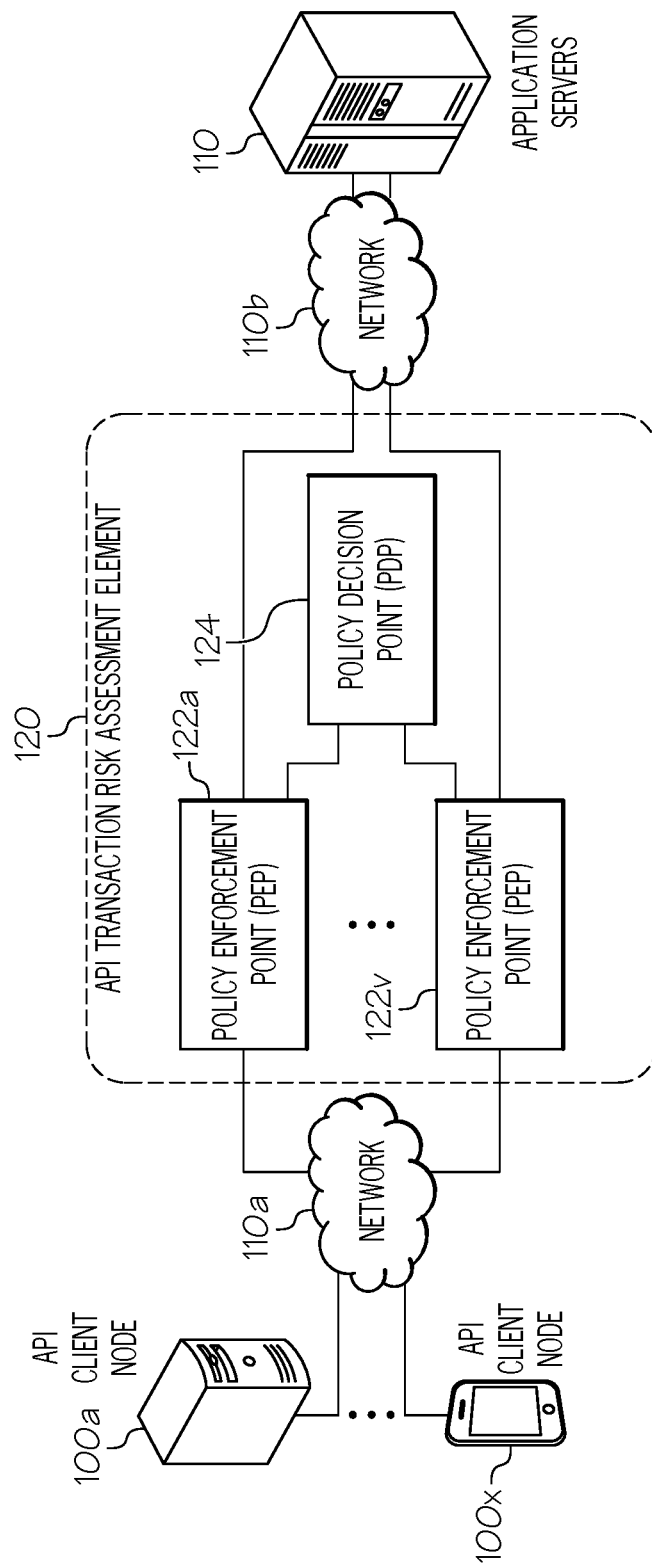
FIG. 6 is a block diagram of a computer system that includes API transaction risk assessment element that intercepts and controls deliverability of API transaction requests from API client nodes to application servers, in accordance with a non-limiting embodiment of the present disclosure.

FIG. 6 is a block diagram of a computer system that includes API transaction risk assessment element that intercepts and controls deliverability of API transaction requests from API client nodes to application servers, in accordance with a non-limiting embodiment of the present disclosure. An IoT device may comprise an API client node. FIG. 6 illustrates a computer system that includes API transaction risk assessment element 120 that may intercept and control deliverability of API transaction requests from API client nodes 100a-100x to application servers 110 for processing. Any description of analysis, functionality, and/or capability of the system regarding API transaction risk assessment may also apply to data risk assessment, and vice versa.

Referring to FIG. 6, The API transaction risk assessment element 120 may receive API transaction requests (e.g., Web API service calls, RESTful API transactions, etc.) through one or more data networks 110a from applications processed by one or more API client nodes 100a-100x. The API transaction risk assessment element 120 may operate on each of the API transaction requests to generate an API risk assessment score based on context information that characterizes the API transaction request. The API risk assessment score may indicate a level of trustworthiness of the API transaction request for processing by an application on the application servers 110. The API transaction risk assessment element 120 can control deliverability of the API transaction request through one or more data networks 110b to the application servers 110 for processing based on the risk assessment score.

Because the API risk assessment is performed by the API transaction risk assessment element 120 and, may be performed before the API transaction request reaches the destination node 110 for processing by an application on the application severs 110, the application can be protected from potential damage and the amount of checking can be reduced that is needed by the application or another component of the application servers 110 to obtain a desired level of security.

As will be explained in further detail below, the API risk assessment score can be generated by evaluating contextual elements of the transaction using defined risk assessment rules, algorithms, and machine learning to determine both supervised and unsupervised norms. In one embodiment, an API risk assessment score of zero indicates a lowest potential risk of the API transaction causing undesired operation when processed by the application servers 110. In contrast, an API risk assessment score of 100 indicates a highest potential risk of the API transaction causing such undesired operation. Various types of undesirable operations that an API transaction may be assessed for as possibly causing risks can include, but are not limited to, attempting to obtain information from application servers 110 for delivery to a falsely identified API client application, attempting to obtain information from the application servers 110 that is unauthorized by access privileges of an API client application, attempting to improperly modify operation of one or more applications on the application servers 110, and/or attempting to improperly utilize resources of the application servers 110 (e.g., access resources that are not authorized for use by the API client application).

The source nodes (e.g., API client nodes 100a-100x) can be any type of computer equipment that processes applications to generate API transactions requests, such as Web API service calls, RESTful API transactions, etc., and may include, but are not limited to desktop computers, laptop computers, tablet computers, smart phones, application servers, and mainframe computers. The destination nodes may correspondingly be any type of computer equipment having applications that expose services through APIs and process API transaction requests received through APIs, such as Web API service calls, RESTful API transactions, etc., and may include, but are not limited to mainframe computers, application servers, desktop computers, laptop computers, tablet computers, and smart phones.

As illustrated in FIG. 6, operations of the API transaction risk assessment element 120 may reside in a plurality of policy enforcement points (PEPs) 122a-122y and a policy decision point (PDP) 124. One or more of the PEPs 122a-122y may be processed by a same computer host as the PDP 124, or may be processed on physically separate computer hosts that have different network addresses and communicate between them through one or more data networks 110a, 110b, etc. Accordingly, the PDP 124 may operate as a centralized policy decision point for the plurality of geographically dispersed and communicatively connected PEPs 122a-122y that control deliverability of API transaction request from any number of resource nodes (e.g. API clients 100) to any number of destination nodes (e.g. application servers 110). Although a single PDP 124 and two PEPs 122a-y are shown in FIG. 1, it is to be understood that any number of PDP 124 and PEP 122 may be used with various embodiments disclosed herein. Moreover, one or more of these embodiments may be implemented in any type of computer equipment and are not limited to use in a PDP and/or PEP.

The PEPs 122 may be responsible for generalized message processing of Web service and other API transaction requests. These requests can include SOAP messages using a variety of transport bindings including, but not limited to, HTTP(s), Message-Oriented Middleware (MOM) such as ActiveMQ, email, TCP sockets, (s)FTP(s), etc). API transaction requests following the RESTful architectural pattern can include HTTP(s) transport and message content types that include, but are not limited to, simple text, binary attachments, XML documents, JSON structures, etc. The PEP(s) 122 can also be responsible for application of rules (policy) to Web services or other API transaction requests. The rules can define an algorithm applied to an API transaction request in flight that has not yet been delivered to the destination node. The algorithm can control one or more of: authentication of credentials associated with the API transaction request, validation of content of the API transaction request, modification of content of the API transaction request, and routing of the API transaction request content to the destination node 110 and/or another node of the system and/or another system. Evaluation of these steps may occur locally for performance reasons. However, some steps may leverage additional external infrastructure elements such as directories, databases, or various PDPs such as described herein.

The PDP 124 may be a rules engine that is optimized for risk evaluation. The rules can include rule sets that are compared (e.g., evaluated to determine if one or more is satisfied) to context information of the API transaction request to generate a risk assessment score. Rule sets that detect typical fraud patterns can be defined or developed by learning-based processes over time. In addition, rule sets can be customizable to detect emerging threats or to accommodate local needs. Furthermore, rule sets may also be advanced algorithms or machine learning.

Figure 7:
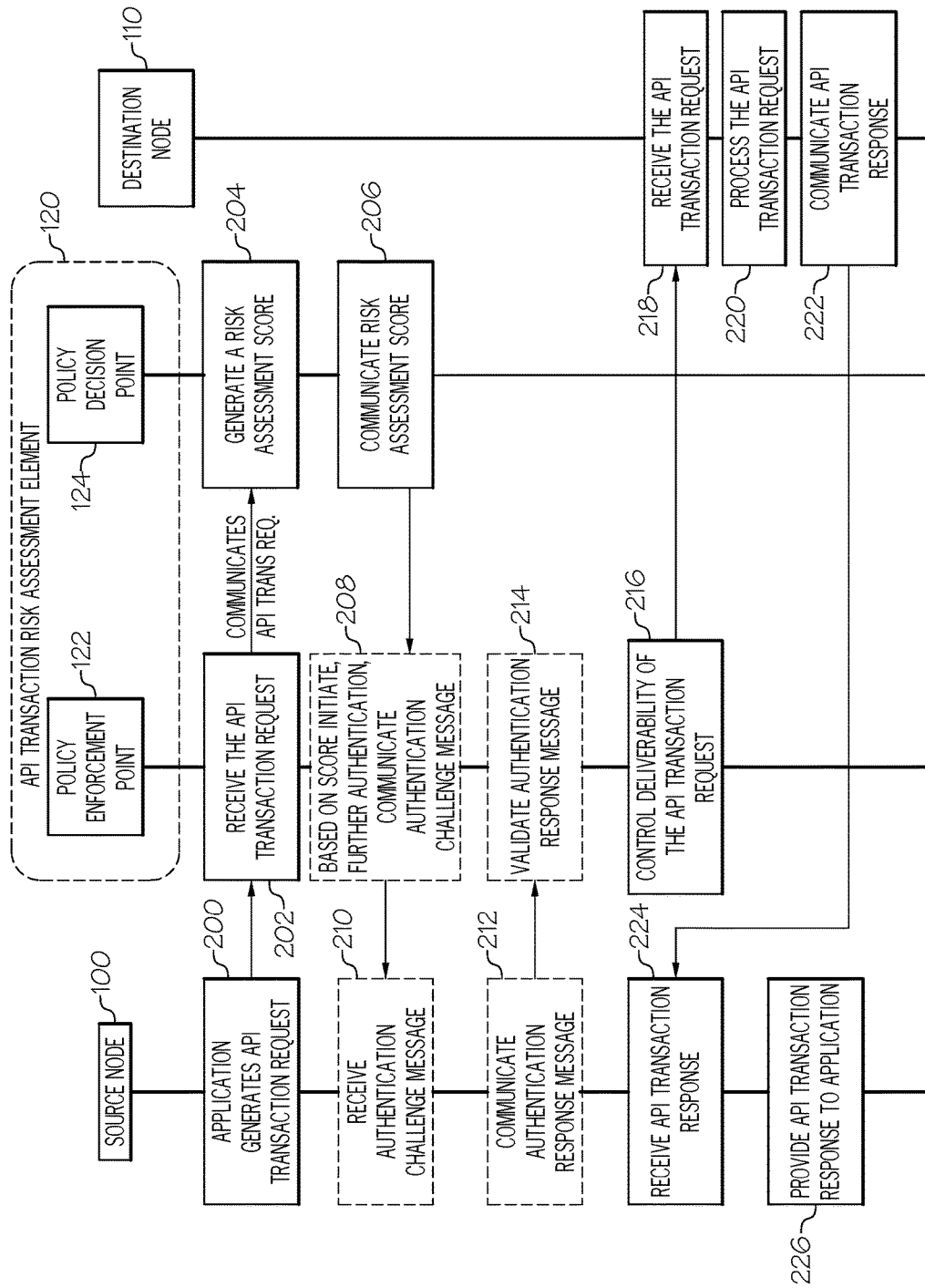
FIG. 7 is a flowchart of operations and information flows that may be performed by the system components a non-limiting embodiment of the present disclosure.

FIG. 7 is a flowchart of operations and information flows that may be performed by the system components a non-limiting embodiment of the present disclosure. FIG. 7 is a flowchart of operations and information flows that may occur between the system components of FIG. 6, in accordance with some non-limiting embodiments of the present disclosure. Referring to FIG. 7, an application processed by the source node 100 (e.g., API client) generates (block 200) an API transaction request that is communicated through a data network for processing by one or more applications at a destination node 110 (e.g., application servers). The PEP 122 receives (block 202) the API transaction request, and may be configured to intercept the API transaction request to prevent it from reaching the destination node 110 without the PEP 122 first authorizing its delivery to the destination node 110. The PEP 122 communicates the API transaction request (e.g., the entire API transaction request or information characterizing the API transaction) to the PDP 124.

The PDP 124 generates (block 204) an API risk assessment score based on context information that characterizes the API transaction request (e.g., the context information may be received from the PEP 122 or may be generated by the PDP 124 based on one or more defined rules). The API risk assessment score indicates a level of trustworthiness of the API transaction request for processing by an application on the destination node 110. The PDP communicates (block 206) the risk assessment score to the PEP 122. The PEP 122 controls (block 216) deliverability of the API transaction request to the destination node 110 for processing based on the API risk assessment score. API transaction requests that are deemed to have insufficient trustworthiness, based on the API risk assessment score and a defined risk assessment rule, are not delivered to the destination node 110 in order to shield the destination node 110 from possible API based intrusion attacks and other malicious or undesirable operations that may occur if the API transaction requests were allowed to be processed by the destination node 110.

The PDP 124 may generate the API risk assessment score based on a collection of context information that characterizes API transaction requests received by a plurality of the PEPs 122. The PDP 124 may generate the API risk assessment score based on a trend over time determined from context information that characterizes API transaction requests received by a plurality of the policy enforcement points from the source node.

The PEP 122 controls (block 216) deliverability of the API transaction request to the destination node 110 for processing based on the API risk assessment score. Depending upon the API risk assessment score, the PEP 122 can deliver the API transaction request to the destination node 110 for receipt (block 218). The destination node 110 processes (block 220) the API transaction request to generate an API transaction response (e.g., by retrieving or generating information requested by the API transaction request), and communicates (block 222) the API transaction response to the source node 100. The source node 100 receives (block 224) the API transaction response, and provides (block 226) the API transaction response to the application on the source node 100 for processing.

The PEP 122 may, based on the API risk assessment score (e.g. API risk assessment score not satisfying a defined threshold value or other risk assessment rule), initiate further authentication through an authentication challenge process that attempts to authenticate the source node 100, the application that generated (block 200) the API transaction request, a person operating the source node 100, etc. The authentication challenge process includes communicating (block 208) an authentication challenge message to the source node 100. The source node 100, or application process thereon, receives (block 210) the authentication challenge message 210 and communicates (block 212) an authentication response message 212, which may contain identification information for the application that generated API transaction request and/or for the source node 100, and/or which may contain an authentication key or other authentication information (which may be based on one or more authentication processes and technologies known in the art). The PEP 122 validates (block 214) content of the authentication response message and can control (block 216) deliverability of API transaction request based on whether or not the authentication response message was properly validated. For example, when the PEP 122 determines that credentials received in the API transaction request are invalid or otherwise suspicious (e.g., based on a defined validation rule or other risk assessment rule), the PEP 122 may discard the API transaction request without delivering it to the source node 110.

The PEP 122 may apply API transaction request handling policies for access control that control whether or not the API transaction request is delivered to the destination node 110, and may also include per-message threat detection, message content transformation, rate limiting, and/or routing to one or more defined other nodes of the system for further analysis and/or deliverability decision-making. The policies can include performing call-outs to provide context information for one or more API transaction request to one or more PDPs 124 for generation of risk assessment score(s) used to control deliverability of API transaction request(s).

In some non-limiting embodiments of the present disclosure, instead of the PEP 122 controlling deliverability of the API request to the destination node 110 for processing based on the API risk assessment score, the PEP 122 may instead forward the API request with the API risk assessment score to the destination node 110. The destination node 110 can then perform policy decision making based on the API risk assessment score to determine whether and/or how it will handle processing of the API request. If the risk assessment score does not satisfy a defined policy, the destination node 110 may, for example, reject the API request, initiate further authentication through an authentication challenge process that attempts to authenticate the source node 100, the application that generated (block 200) the API transaction request, a person operating the source node 100, etc.

The communication interface between the PEP 122 and the PDP 124 may be based on a request and response API. The PEP 122 may communicate (block 202) to the PDP 124 information that characterizes the originating network address (e.g., IP address) of the source node 100, an authenticated identifier of the application which generated the API transaction request or an unauthenticated identifier of the application, a unique device identifier for the source node 100 or an electronic device associated therewith, and/or one or more custom elements associated with the API transaction request, which may include transport meta data (e.g., query or post parameters, URL, HTTP headers, MOM-headers, etc), API transaction request content (e.g., a credit card number), and/or or operational state variables of the PEP 122. The operational state variables of the PEP 122 may include, for example, a current rate at which API transaction requests are being received for a particular API of the application of the destination node 110 and/or for other applications of the destination node 110, and/or a current rate at which API transaction requests are being received from a particular application of the source node 100 and/or from other applications of the source node 100 or other source nodes, etc.

The PEP 122 may perform operations to control deliverability of the API transaction request based on the risk assessment score. These operations may include any one or more of: allowing the API transaction request by forwarding it to the destination node 110, denying the API transaction request by discarding it to prevent its processing by an application of the destination node 110, delaying delivery of the API transaction request, controlling rate of a sequence of API transaction requests, modifying content of the API transaction request, perform a first/further authentication process, and other operations described below. The PEP 122 may map different ranges of API risk assessment scores to different operations that the PEP 122 may perform to control deliverability of the API transaction request, and may thereby use an API risk assessment score received from the PDP 124 to select among the available operations to control deliverability of the associated API transaction request.

The mapping of different ranges of API risk assessment scores to different available operations to control deliverability of the associated API transaction requests may be configured based on the extent of undesirable consequences that can arise from processing of API transmission requests by the destination node 110. This configuration may occur via an administrator, or via supervised learning techniques. In one embodiment, policies may be defined that cause API transaction requests having a score greater than the first defined threshold (e.g., 50) to be discarded (e.g. blocked), cause API transaction requests having a score less than a second defined threshold (e.g., 20) to be allowed to pass through to the destination node 110 for processing, and cause API transaction requests having a score between the first and second defined thresholds to properly complete further authentication before being allowed to pass through to the destination node 110 for processing.

Figure 8:
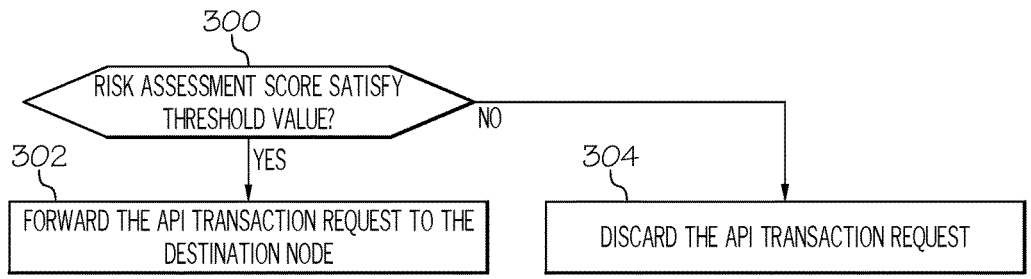
FIGS. 8-10 are flowcharts that illustrate operations that may be performed by one or more components of a non-limiting embodiment of the present disclosure.
Figure 9:
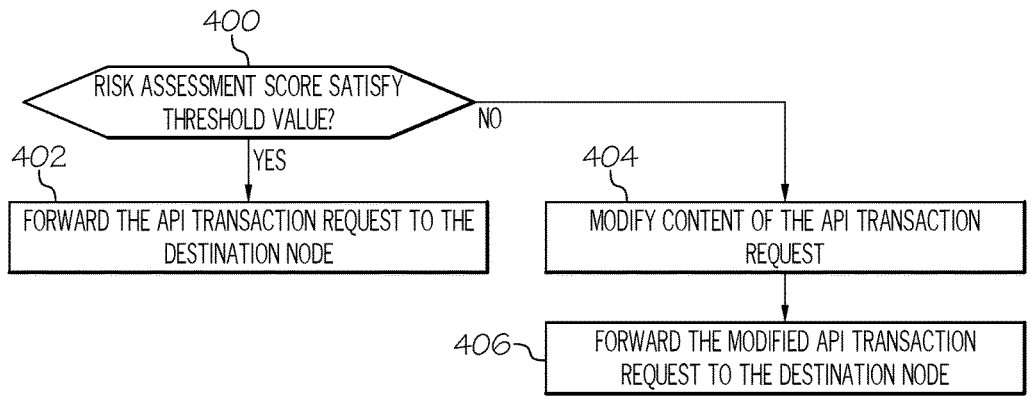
Figure 10:
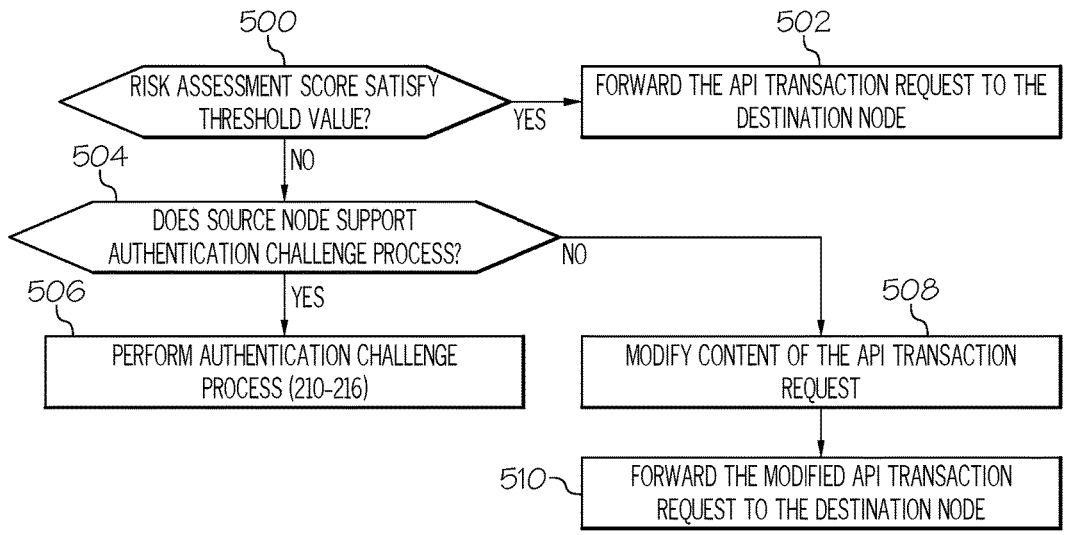

FIGS. 8-10 are flowcharts that illustrate operations that may be performed by one or more components of a non-limiting embodiment of the present disclosure. These flowcharts illustrate operations that may be performed by the PEP 122 of FIG. 6 to control (block 216 of FIG. 7) deliverability of the API transaction request through a data network to the destination node 110 for processing based on determining (blocks 300, 400, 500) whether the API risk assessment score satisfies a threshold value, in accordance with some embodiments.

Referring to FIG. 8, the PEP 122 forwards (block 302) the API transaction request to the destination node 110 based on the API risk assessment score satisfying a threshold value. In contrast, the PEP 122 discards (block 304) the API transaction request to prevent its processing by the application of the destination node 110 based on the API risk assessment score not satisfying the threshold value. A denial of service message may be communicated back to the source node 100 when an API transaction request is discarded, if the source node 100 supports such protocol flow control.

Referring to FIG. 9, the PEP 122 may forward (block 402) the API transaction request to the destination node 110 based on the API risk assessment score satisfying a threshold value or other defined risk assessment rule. In contrast, the PEP 122 may modify (block 404) content of the API transaction request to generate a modified API transaction request based on the risk assessment score not satisfying the threshold value, and may forward (block 406) the modified API transaction request to the destination node 110. The PEP 122 may modify (block 404) content by modifying a variable contained in the modified API transaction request that constrains what type of information will be accessed by the modified API transaction request when processed by the application on the destination node 110.

For example, information processing may depend on context, such as whether an API transaction request is querying a sensitive database. While some information may be provided at a normal rate, other information may be provided at a slower controlled rate to allow continued inspection of the risk of processing the API transaction request. If the continued inspection of the risk of processing the API transaction request results in a sufficiently untrustworthy API risk assessment score, the PEP 122 may terminate any further providing of information from the destination node 110 to the source node 100. The risk engine may configure the PEP to modify an API request that is seeking 100 rows of information to instead provide access to only 20 rows of information if the API transaction request has a sufficiently untrustworthy API risk assessment score.

The PEP 122 may selectively perform the authentication process of blocks 208 and 214 based on whether the source node 100 supports the authentication process. Referring to FIG. 10, when the API risk assessment score is determined (block 500) to satisfy a threshold value, the PEP 122 may forward the API transaction request to the destination node 110 for processing. Otherwise, when the API risk assessment score does not satisfy the threshold value, the PEP 122 may further determine (block 504) whether the source node 100 supports an authentication challenge process. When the authentication challenge process is supported, the PEP 122 and the source node 100 may perform the authentication challenge process of blocks 210-216 of FIG. 7. In contrast, when the authentication challenge process is not supported, the PEP 122 may modify (block 508) content of the API transaction request to generate a modified API transaction request, and may forward (block 510) the modified API transaction request to the destination node 110. Instead of modifying content of the API transaction request, the PEP 122 may discard the API transaction request to prevent its processing by the application of the destination node 110.

The PDP 124 may operate with the PEP 122 to stop an API transaction request in-flight by having the PEP 122 intercept and hold an API transaction request until it receives the API risk assessment score from the PDP 122 and determines therefrom how to control deliverability of the API transaction request to the destination node 110 for processing.

Alternatively, the PDP 124 may monitor API transaction requests without introducing delay (or substantial delay) as they are communicated through one or more networks for receipt by the destination node 110. The PDP 124 may analyze the API transaction requests to identify their untrustworthy characteristics (e.g., identify one or more trustworthiness rules that are satisfied or not satisfied by one or more API transaction requests) potentially after completion of their processing by the destination node 110, and may cause defined remedial actions to be performed to undo the result of an earlier processed API transaction request that has now been deemed sufficiently untrustworthy. Some operations of the PDP 124 may develop based on a web access software architecture provided by the RiskMinder™ product by CA Technologies, Inc.

The PDP 124 may generate an API risk assessment score based on information regarding API transaction requests that are characterized or assessed by other PEPs or by other systems. The PDP 124 may make calls out to other databases to evaluate the API transaction requests. The PDP 124 therefore may be open-ended to include external sources of information as bases for generation of a risk assessment score. The PDP 124 may use information received from a plurality of PEPs when generating an API risk assessment score, which may allow the PDP 124 to look for API transaction request patterns across the system for indications of fraudulent or other undesirable activity which in context should affect an API risk assessment score for a API transaction request.

Referring further to FIG. 7, the PDP 124 may generate (block 204) the API risk assessment score based on comparison of the context information characterizing the API transaction request to defined risk assessment rules, some non-limiting examples of which are described herein. The PDP 124 may identify one of a plurality of known API transaction protocols that is being used by the API transaction request, and generate the API risk assessment score based on whether the identified one of the plurality of known API transaction protocols that is being used by the API transaction request matches an API transaction protocol that is expected to be used by the application processed by the source node. For example, when an API transaction from a particular source node application is provided by a REST API instead of a Web services API or another transaction protocol that is expected to be received, the determination that an API transaction is being used may cause the PDP 124 to indicate a higher assessed risk by the generated API risk assessment score.

The PDP 124 may generate the API risk assessment score based on whether the source node has a network address that is within a list of known network addresses of source nodes that are known to be sources of untrustworthy API transaction requests and/or based on whether the source node has a network address that is within a list of known network addresses of source nodes that are known to be sources of trustworthy API transaction requests. The PDP 124 may determine a routing address pathway through the data network from the source node 100 to the PEP 122, and may generate the API risk assessment score based on whether the routing address pathway includes a network address that is within a list of known network addresses of anonymizing servers, such as virtual private network (VPN) proxy servers or aggregator nodes, or other nodes that are known to be associated with higher or lower level of trustworthiness for API transaction requests, and/or based on whether a network address of the source node cannot be determined from the routing address pathway. In this manner, particular source nodes and/or applications located in some defined geographic regions or having defined identifiers can be blacklisted. A list of source addresses that are known to be compromised, known originator of intrusion or other attacks, and/or associated with fraudulent requests can be developed over time or received from an administrator or system component. Conversely, a list of source addresses (e.g., IP addresses known to be associated with Amazon Web Services, etc.) that are known to be sources of trustworthy API transactions requests may be developed over time or received from an administrator or system component. Furthermore, risk may be calculated by a range of statistical analysis and/or machine learning techniques that have been demonstrated to determine patterns of risky behavior in sources (i.e., source behavior analytics).

The PDP 124 may identify a characteristic of the application processed by the source node 100, and generate the API risk assessment score based on whether content of a sequence of API transaction requests received from the application processed by the source node satisfies a rule that defines what content is acceptable to be received in a sequence of API transaction requests from an application having the characteristic. The PDP 124 may determine what type of information will be accessed by each of a sequence of API transaction requests received from the application when processed by the application on the destination node, and then generate the API risk assessment score based on comparison of the type of information that will be accessed by each of the sequence of API transaction requests to acceptable types of information defined by the rule.

Thus, for example, the type of API transaction request and/or metadata or other content of the API transaction request, an observed sequence of API transactions, the timing of API transaction requests within a sequence of API transactions may be compared to expected/known information to generate the API risk assessment score. The PDP 124 may keep track of sequence of API transactions from a same source node application, from a same source node, from a plurality of source nodes, etc., to generate improved assessments of trustworthiness.

Tracking such sequences may be useful to detect when people try to hack systems by relying upon the fact that the web is not stateful (e.g., each API transaction request contains all information needed to process that request without expecting the destination node 110 to have retained state information from one or more related earlier API transaction requests). Such hackers can attempt to then deviate from a logical or expected sequence to, for example, obtain access to system resources and/or application information for which they are not authorized to access. The PDP 124 may thereby observe sequences and/or timing of API transaction requests and compare such observations to an expected sequence and/or timing of API transaction requests to determine whether it is a trustworthy (e.g., valid) sequence.

The PDP 124 may generate the API risk assessment score based on comparison of a threshold value to a rate at which a sequence of API transaction requests are received from the application processed by the source node. For example, when the rate at which API transaction requests are received from the application on the source node 100 is below a defined or learned threshold (e.g., indicative of the requests being generated by a human instead of by an application), the API risk assessment score may be defined to indicate a low level of trustworthiness (i.e., untrustworthy). For example a source node that submits 1000 API transaction requests over a one minute duration may be confirmed as not being operated by a human being. The types of transactions that are expected to be received in a sequence of requests over time may be compared to an incoming sequence. For example, home banking transactions have an expected pattern over time, e.g., sequentially checking account balances in decreasing/increasing numerical account number order and/or types and/or orders of inquiries (account balance inquiries, deposits, withdrawals).

The PDP 124 may generate the API risk assessment score based on the time of day and/or date of week when then API transaction request is received and a risk assessment rule that defines acceptable or expected timeframes and/or days when such requests are allowable. The rule may be defined by an administrator or learned over time by observing patterns and timing of requests.

The PDP 124 may identify a characteristic of the application processed by the source node, and generate the API risk assessment score based on whether a time delay between receipt of each of a sequence of API transaction requests from the application processed by the source node 100 satisfies a rule that defines expected time delay between receipt of a corresponding sequence of API transaction requests from an application having the characteristic. For example, when a sequence of API transaction requests is expected to be received from the application processed by the source node 100 with a defined elapsed time between, deviations from that the expected timing may cause the API risk assessment score to indicate a low level of trustworthiness and, conversely not deviating from that the expected timing may cause the API risk assessment score to indicate a high level of trustworthiness.

The API risk assessment score may be generated based on a type of device (e.g., mobile phone) that generated the request, a particular type of application (e.g., an application on an iPhone versus an android phone) that generated the request, a type of device operating system, a type of network through which a request is communicated, a particular device ID of the source node 100, or any other characteristic of the source node 100 or intervening system components. The PEP 122 and/or the PDP 124 may perform a deep inspection of content of an API transaction request, and compare the content to expected types of variable/field values and ranges of variable/field values, and/or comparison between values of content variables/fields, and generate the API risk assessment score based thereon. The PEP 122 and/or the PDP 124 may determine the type of application and/or device of the source node 100 (e.g., Apple IOS device, Android OS device, Windows OS device, Unix OS device, etc.), and may restrict deliverability and/or privileges of the API transaction request based thereon. For example, the PDP 124 may vary the API risk assessment score to cause discarding of the API transaction request based on the API transaction request being received from an iPad device and/or based on a value of the request being outside an expected range. This and other risk factors may be calculated from data contained and collected by the system, or through a third-party source. For example, a data provider that curates lists of malicious IP sources.

The PDP 124 may identify a characteristic of the application processed by the source node, and generate the API risk assessment score based on comparison of a threshold value to a rate at which API transaction requests are received from applications having the characteristics that are processed by a plurality of source nodes.

The PDP 124 may determine geographic locations associated with network addresses of the source node contained in a sequence of API transaction requests from the application processed by the source node 100. In addition, this data may come from a third-party curated data set via service. The API risk assessment score may be generated based on whether the geographic locations change more than a threshold distance within a threshold time. For example, if the source node 100 is expected to be stationary or not have more than a threshold velocity, observing more than a threshold velocity may indicate a untrustworthiness of API transaction requests therefrom. Thus, receiving one request from a source node 100 located in a city in California followed by another request within a threshold elapsed time but appearing to be from the same source node 100 but now located in a city in Europe, may be an indication that the request is fraudulent and should be discarded or restricted (e.g., modified) according to one or more embodiments herein. A factor that may be considered when generating the API risk assessment score is whether more than one application is associated with a shared account on the destination node 110.

The API risk assessment score may be generated based on the geographic location of the source node 100, such as based on comparison of the geographic location to one or more defined geographic fence regions (e.g., countries banned under governmental law from business). The PDP 124 may also use external services to acquire deeper information about the API transaction requests. Services such as Neustar (formerly Quova) can provide authoritative geographic coordinates of an IP address (both fixed line and wireless using telco APIs). These can also supply centrally coordinated information about potentially threatening IP addresses based on prior attacks, as well as known proxy services that could be masking a true upstream IP.

The PDP 124 may assess each API transaction request separately (e.g., transaction-by-transaction) or may apply risk assessment rules to assess a sequence of transactions to identify trends or patterns that are indicative or trustworthiness. The PDP 124 may generate the API risk assessment score based on a collection of context information that characterizes API transaction requests received by a plurality of the policy enforcement points. The PDP 124 may compare transactions, sequences, and/or trends from context information across API transaction requests received from a plurality of source nodes 100 and/or which is provided by a plurality of different PEPs 122. The PDP 124 may monitor and identify usage patterns for API transaction requests generated by, for example, a particular application on one of the API clients 100a-100x, a particular type of application on any of the API clients 100a-100x, the content or metadata of the API transaction requests for evaluation in risk analysis.

The PEP 122 may select and apply remediation actions to control deliverability of a presently received API transaction request and/or future received API transaction requests, and/or to remedy actions caused by processing performed by the destination node 110 and/or by the source node 100. The remediation actions may then be applied to change mapping between ranges of API risk assessment scores and corresponding actions performed by the PEP 122 to control deliverability of API transaction requests. Such operations may help to reduce the potential of applications becoming compromised by malicious parties attempting to use limitations of application-to-application communication protocols (e.g., state less transaction protocols).

Operations for controlling deliverability of API transaction requests may include user privilege management. An API transaction request can be handled differently based on an authentication level determined for the source node 100 or an application processed by the source node 100 which generated the API transaction request, and/or based on identification of a user of the source node 100. Different source nodes 100/applications may have different authentication levels. When a source node 100/application has properly performed a step up access control process, the source node 100/application may be granted a more trusted authentication level (e.g., a root account), and API transaction requests received from that source node 100/application may be handled using different deliverability control rules and/or different flow control. For example, the PEP 122 may, depending upon the authentication level of the source node 100/application, can either intercept and hold API transaction requests before selectively delivering to the destination node 110 or allow uncontrolled delivery to the destination node 110 with continuing assessment of risk associated with the API transaction requests. The authentication level of the source node 100/application may be adjusted over time based on comparison of the API transaction requests to risk assessment rules.

Content of the API transaction requests may be modified based on the authentication level of the source node 100/application. Different data can be thereby be provided by the destination node depending upon the authentication level of the source node 100/application. When operating at a root level, API transaction requests from the source node 100/application may cause the destination node 110 to provide a greater quantity of information, more sensitive information, etc. in API transaction responses. For example a root level API source node 100/application who is querying user accounts may be provided a larger set of data (full account details) then a non-root level API source node 100/application that may be provided only the account names and associated name of the persons. The amount of information and/or type of information that is returned responsive to an API transaction request may thereby be dynamically controlled by modification of content of the request based on the risk assessment score.

The PDP 124 may obtain risk assessment rules or algorithms from a remote repository(ies) (e.g., a centralized repository used by a plurality of PDPs) and/or an internal repository, and may develop or modify risk assessment rules or algorithms over time, such as based on feedback received from the PEP 122, the destination node 110 and/or the source node 100/application.

Figure 11:
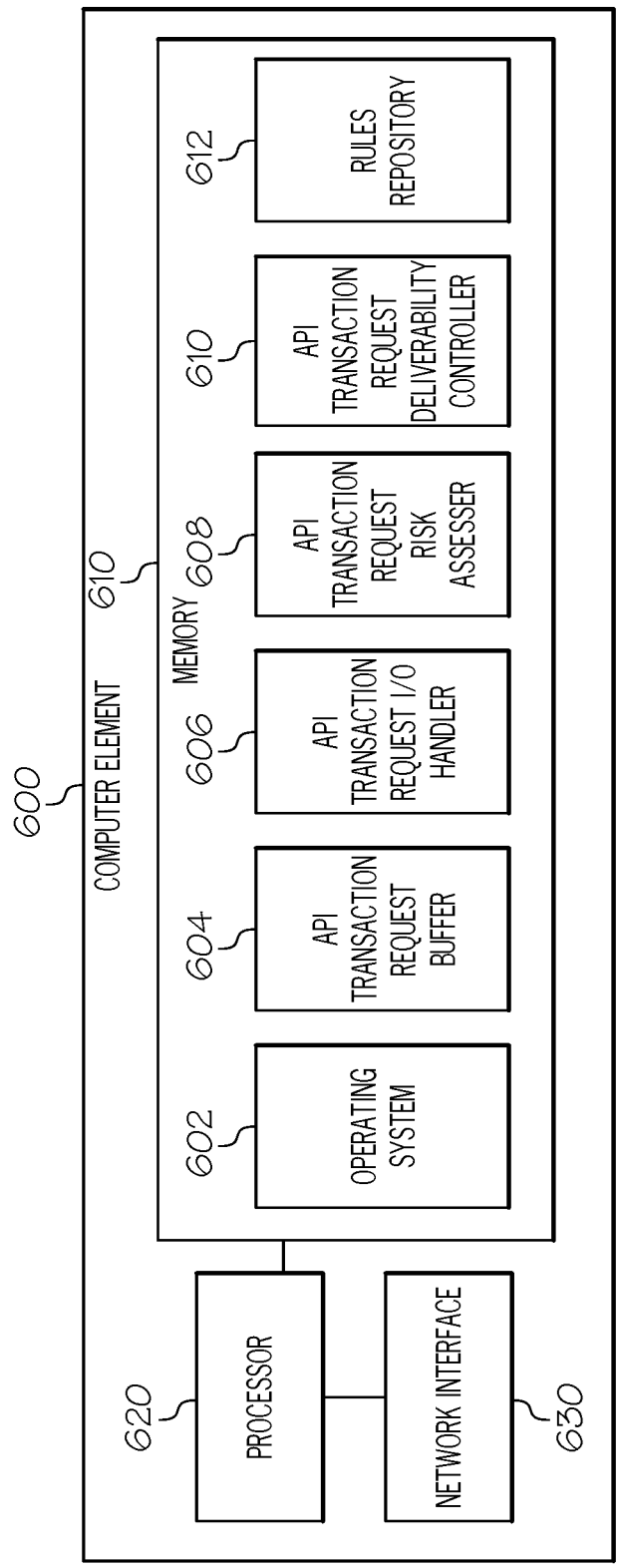
FIG. 11 is a block diagram of computer elements that may be used as one or more components of the API transaction risk assessment element of a non-limiting embodiment of the present disclosure.

FIG. 11 is a block diagram of computer elements that may be used as one or more components of the API transaction risk assessment element of a non-limiting embodiment of the present disclosure. FIG. 11 depicts computer element 600 that may be used as the one or more components of the API transaction risk assessment element 120, in accordance with non-limiting embodiments of the present disclosure. Referring to FIG. 11, the computer element 600 can include a network interface 630 which communicates via the one or more networks 110a/b other components of the element 120 (e.g., PEP 122, PDP 124, etc.), a processor 620, and a memory 610 that contains computer program instructions. The processor 620 may include one or more data processing circuits, such as a general purpose and/or special purpose processor (e.g., microprocessor and/or digital signal processor), which may be collocated or distributed across one or more data networks (e.g., networks 110a-b). The processor 620 may be configured to execute computer program instructions from the memory 610, described below as a computer readable medium, to perform some or all of the operations and methods for one or more of the embodiments disclosed herein.

The software may include applications 606-610 and an operating system 602. The operating system 602 may manage operation of the computer element 600 and execution of the applications 606-610. An API transaction request buffer 604 may temporarily buffer API transaction requests received from source nodes until their deliverability is controlled. An API transaction request input/output (I/O) handler 606 may control receipt of API transaction requests, buffering of requests in the buffer 604, and delivery of requests to identified destination nodes or other network addresses. An API transaction request risk assessor 608 may generate API risk assessment scores based on one more risk assessment rules that reside in a rules repository 612. An API transaction request deliverability controller 610 may control deliverability of buffered API transaction requests based on API risk assessment scores. The buffer 604, the handler 606, and the deliverability controller 610 may reside in a PEP 122. The risk assessor 608 and the rules repository. 612 may reside in a PDP 124.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus, and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The flowchart and block diagrams in the figures illustrate examples of the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" or "/" includes any and all combinations of one or more of the associated listed items.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
   receiving a plurality of node data streams through a data network from a plurality of source nodes, respectively, each of the plurality of node data streams comprising a plurality of node data;
   determining a respective risk assessment for each of the plurality of node data streams based on characteristics of each source node and based on consistency of the plurality of node data of each source node compared within the node data of each source node and compared with the node data of other node data within the plurality of node data streams, wherein the respective risk assessment indicates a level of reliability of each of the plurality of node data streams;
   determining a respective action for each of the plurality of source nodes, based on the respective risk assessment of the plurality of node data streams, the respective action to adjust an interval reading of the source node or to calibrate the source node, and wherein determining a respective action for each of the plurality of source nodes further comprises determining a respective action based on the response latency or geographic location of the source node;
   transmitting, through the data network, instructions for each of the plurality of source nodes to perform the respective action.

2. The method of claim 1, further comprising:
   adjusting, in real time, the risk assessment of each of the plurality of node data streams in response to the performance of the respective action by each of the plurality of source nodes.

3. The method of claim 1, further comprising:
   determining, based on the risk assessments of the plurality of node data streams, a risk landscape of the plurality of source nodes.

4. The method of claim 3, wherein determining a respective risk assessment for each of the plurality of node data streams further comprises:
   comparing each of the plurality of node data streams to the risk landscape.

5. The method of claim 1, wherein determining a respective risk assessment for each of the plurality of node data streams further comprises:
   determining a baseline performance for each of the plurality of source nodes, respectively;
   determining a deviation between a node performance of each of the plurality of node data streams and the respective baseline performance.

6. The method of claim 1, wherein determining a respective risk assessment for each of the plurality of node data further comprises:
   determining a baseline performance for each of the plurality of source nodes, respectively;
   determining a deviation between a node performance of one of the plurality of node data streams of one of the plurality of source nodes and the respective baseline performance of at least another one of the plurality of source nodes.

7. The method of claim 1, further comprising:
   appending each of the plurality of node data with the respective risk assessment of the respective node data stream;
   publishing the plurality of node data with the respective risk assessments to a publish-subscribe system.

8. The method of claim 1, the characteristics comprising a source node calibration history of the plurality of source nodes, respectively.

9. The method of claim 1, the characteristics comprising a source node specification standard of the plurality of source nodes, respectively.

10. The method of claim 1, wherein the characteristics comprises a geographic location of the source node; and
    wherein determining a respective action for each of the plurality of source nodes further comprises determining a respective action based on the geographic location of the source node.

11. The method of claim 10, wherein the characteristics comprises a response latency of the source node; and
    wherein determining a respective action for each of the plurality of source nodes further comprises determining the respective action based on the response latency of the source node.

12. A system comprising:
    a computer processor configured to perform processes comprising:
    receiving a plurality of node data streams through a data network from a plurality of source nodes, respectively, each of the plurality of node data streams comprising a plurality of node data;
    determining a respective risk assessment for each of the plurality of node data streams based on characteristics of each source node and based on consistency of the plurality of node data of each source node compared within the node data of each source node and compared with the node data of other node data within the plurality of node data streams, wherein the respective risk assessment indicates a level of reliability of each of the plurality of node data streams;
    determining a plurality of respective actions for each of the plurality of source nodes, based on the respective risk assessment of the plurality of node data streams;

instructing each of the plurality of source nodes to perform the respective action, the respective action to adjust an interval reading of the source node or to calibrate the source node, and wherein determining a respective action for each of the plurality of source nodes further comprises determining a respective action based on the response latency or geographic location of the source node; and adjusting, in real time, the risk assessment of each of the plurality of node data streams in response to the performance of the respective action by each of the plurality of source nodes.

13. The system of claim 12, the characteristics further comprising:
a geographic location of the source node; and
a humidity measurement of the source node.

14. The system of claim 12, further comprising:
determining, based on the risk assessments of the plurality of node data streams, a risk landscape of the plurality of source nodes.

15. The system of claim 14, wherein determining a respective risk assessment for each of the plurality of node data streams further comprises:
comparing each of the plurality of node data streams to the risk landscape.

16. The system of claim 12, wherein determining a respective risk assessment for each of the plurality of node data streams further comprises:
determining a baseline performance for each of the plurality of source nodes, respectively;
determining a deviation between a node performance of each of the plurality of node data streams and the respective baseline performance.

17. The system of claim 12, wherein determining a respective risk assessment for each of the plurality of node data further comprises:
determining a baseline performance for each of the plurality of source nodes, respectively;
determining a deviation between a node performance of one of the plurality of node data streams of one of the plurality of source nodes and the respective baseline performance of at least another one of the plurality of source nodes.

18. The system of claim 12, further comprising:
appending each of the plurality of node data with the respective risk assessment of the respective node data stream;
publishing the plurality of node data with the risk assessment to a publish-subscribe system.

19. The system of claim 12, the plurality of elements comprising a source node calibration history of the plurality of source nodes, respectively.

20. A computer program product comprising:
a non-transitory computer-readable storage medium having computer-readable program code embodied therewith, the computer-readable program code comprising:
computer-readable program code configured to receive a plurality of node data streams through a data network from a plurality of source nodes, respectively, each of the plurality of node data streams comprising a plurality of node data;
computer-readable program code configured to determine a respective risk assessment for each of the plurality of node data streams based on characteristics of each source node and based on consistency of the plurality of node data of each source node compared within the node data of each source node and compared with the node data of other node data within the plurality of node data streams, wherein the respective risk assessment indicates a level of reliability of each of the plurality of node data streams;
computer-readable program code configured to determine a plurality of respective actions for each of the plurality of source nodes, based on the respective risk assessment of the plurality of node data streams;
computer-readable program code configured to instruct each of the plurality of source nodes to perform the respective action, the respective action to adjust an interval reading of the source node or to calibrate the source node, and wherein determining a respective action for each of the plurality of source nodes further comprises determining a respective action based on the response latency or geographic location of the source node; and
computer-readable program code configured to adjust, in real time, the risk assessment of each of the plurality of node data streams in response to the performance of the respective action by each of the plurality of source nodes.

* * * * *